(12) United States Patent
Kanitz et al.

(10) Patent No.: US 6,284,889 B1
(45) Date of Patent: Sep. 4, 2001

(54) CHROMOPHORIC COMPOUNDS AND PROCESS FOR THEIR PREPARATION

(75) Inventors: Andreas Kanitz, Hoechstadt; Horst Hartmann, Merseburg; Christian Fricke, Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/265,157

(22) Filed: Mar. 9, 1999

(30) Foreign Application Priority Data

Mar. 9, 1998 (DE) .............................. 198 10 030

(51) Int. Cl.$^7$ ................................. C07D 265/34
(52) U.S. Cl. .................................. 544/99
(58) Field of Search ............................... 544/99

(56) References Cited

U.S. PATENT DOCUMENTS 4,962,197 * 10/1990 Foley et al. ............................ 544/31
5,529,864  6/1996 Tachibana et al. ..................... 430/20

FOREIGN PATENT DOCUMENTS

| 619 476 A5 | 9/1980 | (CH) . |
| 0 177 317 A1 | 4/1986 | (EP) . |
| 2 284 427 A | 6/1995 | (GB) . |
| 8-20614 | 1/1996 | (JP) . |

OTHER PUBLICATIONS

Sen et al. Chemical Abstract 55:548f, 1961.*
CAS Printout for CA 55:548f, 1961.*
Briggs et al. Synthesis of functionalised fluorescent dyes and their coupling to amines and amino acids. J. Chem. Soc., 1997.*
G.A. Lindsay et al.: "Second harmonic generation from new dyes in polymer films", Proc. SPIE, vol. 2143 (1994), pp. 88–98.
O. E. Ignasheva et al.: "Vacuum–deposited thin films of 3–methacryloyloxy–9–diethylamino–5–dicyanomethylene–5H–benzo[a]phenoxazine", Thin Solid Films, vol. 238 (1994), pp. 141–145.
C. O. Okafor: "Synthesis, Properties and Uses of Angular Phenoxazines", Dyes and Pigments, 7 (1986) No. 2, Amsterdam, Netherlands, pp. 103–131.
Lingaiah Nagarapu et al.: New 1,4–benzoxazine fused heterocycles: Synthesis of 9H–thieno[3,2–b][1,4]–benzoxazine and 4H–thiazolo [2,3–b][1,4]benzoxazine derivatives, Indian Journal of Chemistry, vol. 37B, Jan. 1998, pp. 39–42.

* cited by examiner

Primary Examiner—Mukund J. Shah
Assistant Examiner—Hong Liu
(74) Attorney, Agent, or Firm—Herbert L. Lerner; Laurence A. Greenberg; Werner H. Stemer

(57) ABSTRACT

The invention relates to chromophoric NLO-active compounds of the general formula

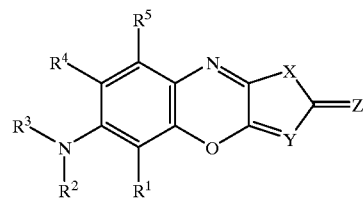

and to a process for preparing such compounds.

The compounds according to the invention can be used for preparing NLO-active polymers and thus for constructing electrooptical and photonic components.

14 Claims, No Drawings

1

CHROMOPHORIC COMPOUNDS AND PROCESS FOR THEIR PREPARATION

BACKGROUND OF THE INVENTION

1. Field of the Invention

The present invention relates to novel chromophoric compounds and to a process for their preparation.

2. Description of the Related Art

Chromophoric compounds, in particular nonlinear optical chromophores, represent the essential component for so-called organic conductors, i.e. for electrically conductive materials. Organic conductors are used for electrooptical and photonic components, in particular switches, and in areas of information processing and integrated optics, such as optical chip-to-chip connections, waveguiding in electrooptical layers, in the optical signal processing in sensors, and the like.

In general, chromophoric systems have conjugated π-electron systems in the molecule and carry electron donors or acceptors in suitable positions of the π-electron system. NLO-active chromophores attracting great interest are those having a high dipole moment $\mu$, a high hyperpolarizability $\beta$ and suitable absorption properties $\lambda$ as well as a high nonlinear optical activity. For the various areas of use, they should also have high thermostability. However, the systems known from the prior art are very sensitive to high temperatures.

SUMMARY OF THE INVENTION

It is therefore an object of the present invention to provide novel nonlinear optical chromophores having the above-mentioned properties, which can be prepared in high purity and in a simple manner from readily obtainable starting materials.

This object is achieved by the oxazine compounds according to the invention, particularly novel benzoxazine and phenoxazine compounds, and the process for their preparation.

The present invention accordingly provides chromophoric compounds of the general formula 1

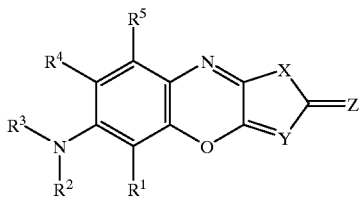

where

R$^1$, R$^4$, R$^5$ are each a hydrogen atom, a linear or branched C$_1$- to C$_{20}$-alkyl radical which is optionally interrupted by 1 to 5 ether oxygen atoms, or an aryl or heteroaryl radical;

R$^2$, R$^3$, which can be the same or different, are each a hydrogen atom, a linear or branched C$_1$- to C$_{20}$-alkyl radical which is optionally interrupted by 1 to 5 ether oxygen atoms, a benzyl radical or an aryl or heteroaryl radical, where one of the radicals R$^2$ and R$^3$ optionally has a hydroxyl or carboxyl group;

Z is an electron-acceptor-substituted methylene or imino group;

X denotes S, O, NR$^6$ or a ring double bond or denotes

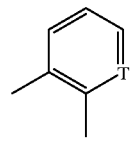

where R$^6$ is a hydrogen atom, a linear or branched C$_1$- to C$_{20}$-alkyl radical or a phenyl or naphthyl radical and T denotes CH or N or Z and T together optionally form a structure of the type =N—SO$_2$—C≡, =N—CS—C≡ or =N—CO—C≡; and Y is a CH or CR$^7$ group or N where R$^7$ is a linear or branched C$_1$- to C$_{20}$ alkyl radical or a phenyl or a naphthyl radical.

The present invention therefore also provides a process for preparing chromophoric compounds of the general formula 1

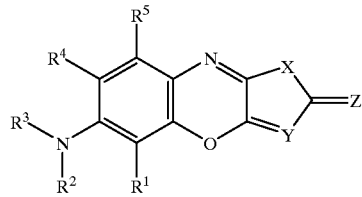

by heating an appropriate 5-amino-2-nitrosophenol or a mineral acid salt of the general formula 2 with a methylene-active compound of the general formula 3A or the tautomeric form 3B

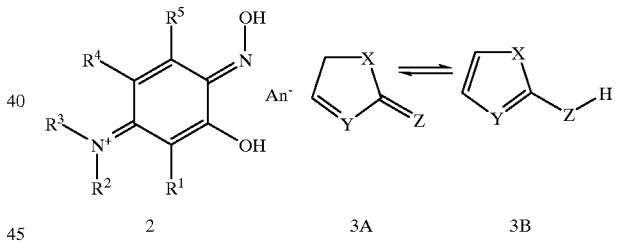

in a polar solvent, and in the presence of a base, for example, triethylamine.

In the formulae 2 and 3A or 3B shown above, the radicals R$^1$, R$^2$, R$^3$, R$^4$ and R$^5$ and X, Y and Z are as defined for formula 1.

DESCRIPTION OF THE PREFERRED EMBODIMENTS

In a preferred embodiment of the present invention, the radicals R$^1$, R$^4$ and R$^5$ each denote a hydrogen atom. The radicals R$^2$ and R$^3$ preferably denote—independently of one another—a C$_2$- to C$_7$-alkyl radical, most preferably an ethyl, butyl or heptyl group. One of the radicals R$^2$ and R$^3$ advantageously has a functional group in the form of a hydroxyalkyl or carboxyalkyl group (having a terminal OH or COOH group), for example a hydroxyethyl group.

Where R$^1$, R$^2$, R$^3$, R$^4$ and/or R$^5$ denote a heteroaryl radical, this s preferably selected from the group consisting of thiophenes, thiazoles and pyridines, i.e. a thienyl, thiazolyl or pyridyl radical is present; preferred aryl radicals are phenyl or naphthyl radical.

In the context of the present invention, preference is given to those compounds of the general formula 1 shown above in which the radicals $R^1$ and $R^2$ have suitable functional groups so that they can jointly form a 5- or 6-membered ring.

The radicals $R^3$ and $R^4$ in the general formula 1 may likewise have suitable functional groups so that they can jointly form a 5- or 6-membered ring. In addition, the radicals $R^1$ and $R^2$ and also $R^3$ and $R^4$ together may in each case denote such a saturated or unsaturated substituted or unsubstituted 5- or 6-membered ring.

In another preferred embodiment of the invention, the radicals $R^2$ and $R^3$ in the general formula 1 shown above likewise comprise functional groups which are suitable for jointly forming a 5- or 6-membered ring; this ring optionally has a directly bonded OH or COOH group or an OH or COOH group which is bonded via an aliphatic hydrocarbon radical. As in the case of $R^1$ and $R^2$ and also $R^3$ and $R^4$, 5- or 6-membered rings can be formed which may be substituted or unsubstituted and saturated or unsaturated. However, the ring system is preferably saturated and has, in a further preferred embodiment, at least one other nitrogen or oxygen atom in the ring, in addition to the original nitrogen atom. Again, as before, this ring may be substituted or unsubstituted.

If there are substituents present on the ring, these are, in another preferred embodiment, additional functional groups, such as, for example, hydroxyalkyl or carboxy-alkyl groups. By appropriately selecting the functionalities of the radicals $R^2$ and $R^3$, these may give ring groupings of the morpholine or piperazine type. Here, preference is given to morpholin-4-yl, piperazin-1-yl and 4-($C_1$- to $C_4$-alkyl)piperazin-1-yl groups, for example to the 4-methylpiperazin-1-yl and the 4-(2-hydroxyethyl)piperazin-1-yl group.

Particularly preferred radicals or atom groups in the above-mentioned formula 1 are hydrogen atoms for $R^1$, $R^4$ and $R^5$, ethyl, butyl, heptyl or hydroxyethyl groups for $R^2$ and $R^3$, sulfur or an unsubstituted 1,2-fused benzene ring for X, the group —CH for Y, a dicyanomethylene, alkoxycarbonylcyanomethylene, cyanoimino or alkoxycarbonylimino group for Z and the group =N—$SO_2$—C≡ for Z and T together.

Particularly preferred compounds of general formula 1 are those whose preparation is described in the examples. These are:

benzo[a]-5-dicyanomethylene-9-[N,N-diethylamino]-7,12-phenoxazine benzo[a]-5-dicyanomethylene-9-[N,N-di(n-butyl)amino]-7,12-phenoxazine benzo[a]-5-dicyanomethylene-9-[N-(n-butyl)-N-(2-hydroxyethyl)amino]-7,12-phenoxazine benzo[a]-5-dicyanomethylene-9-[N-(n-heptyl)-N-(2-hydroxyethyl)amino]-7,12-phenoxazine 2-dicyanomethylene-6-[N,N-diethylamino]thieno[4,5-b]-benzo-4,9-oxazine 9-[N-(n-heptyl)-N-(2-hydroxyethyl)amino]benzo[d]isothiazolo[3,3a,4-ab]phen-7,12-oxazine 4-dioxide.

Thus, the compounds according to the invention can be seen as oxazine derivatives, in particular as benzoxazines and phenoxazines.

The above-mentioned compounds are so-called nonlinear optical chromophores having a high $\mu$ value and at the same time high $\beta$ and suitable $\lambda_{max}$ values. Suitable $\lambda_{max}$ values are greater than 600 nm and are preferably about 700 nm. The chromophores can be obtained in high purity in a simple and economical manner from easily accessible starting materials.

Both the aminonitrosophenol compounds of formula 2 and the methylene-active compounds of formula 3A or their tautomeric form 3B are easily accessible starting materials, so that the preparation of the compounds of the formula 1 can be carried out with an economical yield. The 5-amino-2-nitrosophenols of the formula 2 can be prepared in a simple manner by nitrosation of the corresponding 3-aminophenols. The resulting 5-amino-2-nitrosophenols are preferably reacted in an equimolar ratio with the appropriate methylene-active compounds.

If mineral acid salts of the compounds of the formula 2 are employed as starting materials, $An^-$ denotes the anion of any mineral acid, such as a chloride, bromide or iodide or perchlorate, tetrafluoroborate or tetraphenylborate anion. Particularly preferred anions in the compound of type 2 are the anions of those acids which form salts which crystallize well. These are preferably the chloride or perchlorate anion. The preferred polar solvent is dimethylformamide, dimethylacetamide or N-methylpyrrolidone. Suitable and therefore preferred reaction temperatures are between 120 and 150° C.

The starting materials mentioned are preferably reacted with each other in an equimolar ratio, although either reactant can be used in excess to maximize the utilization of the costlier reactant. The products formed are precipitated by diluting the reaction solution with a less polar solvent, such as diethyl ether or a lower alkanol, and are isolated by filtration with suction and, if appropriate, purified by recrystallization or chromatography.

Accordingly, the process according to the invention is preferably carried out by conducting the condensation of a compound of general formula 2 with a compound of general formula 3A or 3B—in an equimolar ratio—in dimethylformamide, dimethylacetamide or N-methylpyrrolidone at a temperature between 120 and 150° C.

Other features which are considered as characteristic for the invention are set forth in the appended claims.

Although the invention is illustrated and described herein as embodied in chromophoric compounds and process for their preparation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific examples, where the preparation of mineral acid salts of 5-amino-substituted 2-nitrosophenols is shown in Examples 1 to 4, the preparation of methylene-active nitriles is shown in Examples 5 and 6, and Examples 7 to 12 describe the preparation of chromophoric compounds which are particularly preferred in accordance with the present invention.

The abbreviations used in the examples denote: m.p.=melting point; decomp.=decomposition.

EXAMPLE 1

5-Diethylamino-2-nitrosophenol hydrochloride 0.1 mol of 3-diethylaminophenol are dissolved in 50 ml of n-propanol saturated with gaseous hydrogen chloride and, at 0° C., admixed dropwise and with stirring with 0.1 mol of isoamyl nitrite. Stirring is continued for another hour and the reaction solution is then admixed with diethyl ether, and the product which is formed is isolated by filtration with suction.

Yield: 71%, m.p.: 175–177° C.

EXAMPLE 2

5-N,N-di(n-butylamino)-2-nitrosophenol hydrochloride

By the method of Example 1, 5-N,N-di(n-butylamino)-2-nitrosophenol hydrochloride is obtained from 0.1 mol of 3-(N,N-di-n-butylamino)phenol and 0.1 mol of isoamyl nitrite.

Yield: 53%, m.p.: 160° C. (decomp.).

EXAMPLE 3

5-[N-n-butyl-N-(2-hydroxyethyl)amino]-2-nitrosophenol hydrochloride

Using the method of Example 1, 5-[N-n-butyl-N-(2-hydroxyethyl)amino]-2-nitrosophenol hydrochloride is obtained from 0.1 mol of 3-[N-n-butyl-N-(2-hydroxyethyl)amino]phenol and 0.1 mol of isoamyl nitrite.

Yield: 76%, m.p.: 127° C. (decomp.).

EXAMPLE 4

5-[N-n-heptyl-N-(2-hydroxyethyl)amino]-2-nitrosophenol hydrochloride

Using the method of Example 1, 5-[N-n-heptyl-N-(2-hydroxyethyl)amino]-2-nitrosophenol hydrochloride is obtained from 0.1 mol of 3-[N-n-heptyl-N-(2-hydroxyethyl)amino]phenol and 0.1 mol of isoamyl nitrite.

Yield: 62%, m.p.: 129° C. (decomp.).

EXAMPLE 5

1-Naphthylmalononitrile

With stirring and cooling, 0.3 mol of 1-naphthylacetonitrile and then, dropwise, 0.6 mol of 2-chlorobenzyl thiocyanate are added to a solution of 0.65 mol of lithium diisopropylamide in benzene. After one hour, the reaction mixture is introduced into 1 l of 0.3 molar NaOH, and the mixture is allowed to stand for a while and then the two phases which are formed are separated. The aqueous solution is neutralized by adding hydrochloric acid and allowed to stand overnight. The precipitated product is filtered off with suction, dried and purified by recrystallization from ethanol.

Yield: 32%, m.p.: 165° C.

EXAMPLE 6

2-Thienylmalononitrile

Variant a

Using the method of Example 5, the title compound is obtained from 0.1 mol of 2-thienylacetonitrile, 0.3 mol of lithium diisopropyl-amide and 0.2 mol of 2-chlorobenzyl thiocyanate.

Yield: 24%, colorless oil.

Variant b

With stirring and cooling, 0.13 mol of malononitrile in 100 ml of anhydrous tetrahydrofuran are admixed a little at a time with 0.15 mol of sodium hydride. 0.0015 mol of palladium chloride/triphenylphosphine complex are added and 25 g of 2-iodothiophene are subsequently added dropwise, and the mixture is then heated under reflux for 3 h. After cooling, the mixture is neutralized with hydrochloric acid and extracted with diethyl ether. The ethereal solution is separated and dried, the ether is evaporated; and the oily reaction product that remains is used for the subsequent reactions.

EXAMPLE 7

Benzo[a]-5-dicyanomethylene-9-[N,N-diethylamino]-7,12-phenoxazine

Variant a 0.01 mol of the hydrochloride of 5-diethylamino-2-nitrosophenol prepared according to Example 1 and 0.01 mol of 1-naphthylmalononitrile prepared according to Example 5 and 0.02 mol of triethylamine in 15 ml of dimethylformamide (DMF) are heated at the boil for a short while. After cooling, the reaction mixture is stirred with water and decanted off from the solid product that precipitates. The solid product is dissolved in dichloroethane and, after drying and concentration, purified by silica gel column chromatography using ethyl acetate as mobile phase.

Yield: 85%; m.p.: 262–263° C.; $\lambda_{max}$: 700 nm (in DMF).

Variant b

The method of variant a is adopted. However, instead of the hydrochloride of 5-diethylamino-2-nitrosophenol, the free base is employed, and the use of triethylamine is dispensed with.

EXAMPLE 8

Benzo[a]-5-dicyanomethylene-9-[N,N-di(n-butyl)amino]-7,12-phenoxazine

By the method of Example 7, the title compound is obtained from the hydrochloride of 5-[N,N-di-(n-butyl)amino]-2-nitrosophenol prepared according to Example 2 and the 1-naphthylmalononitrile prepared according to Example 5.

Yield: 42%; m.p.: 153–155° C.; $\lambda_{max}$: 701 nm (in DMF).

EXAMPLE 9

Benzo[a]-5-dicyanomethylene-9-[N-(n-butyl)-N-(2-hydroxyethyl)amino]-7,12-phenoxazine By the method of Example 7, the title compound is obtained from the hydrochloride of 5-[N-(n-butyl)-N-(2-hydroxyethyl)amino]-2-nitrosophenol prepared according to Example 3 and the 1-naphthylmalononitrile prepared according to Example 5.

Yield: 30%; m.p.: 190° C; $\lambda_{max}$: 699 nm (in DMF).

EXAMPLE 10

Benzo[a]-5-dicyanomethylene-9-[N-(n-heptyl)-N-(2-hydroxyethyl)amino]-7,12-phenoxazine By the method of Example 7, the title compound is obtained from the hydrochloride of 5-[N-(n-heptyl)-N-(2-hydroxyethyl)amino]-2-nitrosophenol prepared according to Example 4 and the 1-naphthylmalononitrile prepared according to Example 5.

Yield: 28%; m.p.: 155–157° C.; $\lambda_{max}$: 701 nm (in DMF).

EXAMPLE 11

2-Dicyanomethylene-6-[N,N-diethylamino]thieno[4,5-b]benzo-4,9-oxazine

By the method of Example 7, the title compound is obtained from the hydrochloride of 5-diethylamino-2-nitrosophenol prepared according to Example 1 and the 2-thienylmalononitrile prepared according to Example 6.

Yield: 23%; m.p.: 260° C.; $\lambda_{max}$: 657 nm (in DMF).

EXAMPLE 12

9-[N-(n-Heptyl)-N-(2-hydroxyethyl)amino]benzo[d]isothiazolo[3,3a,4-ab]phen-7,12-oxazine 4-dioxide By the method of Example 7, the title compound, which has the following structure:

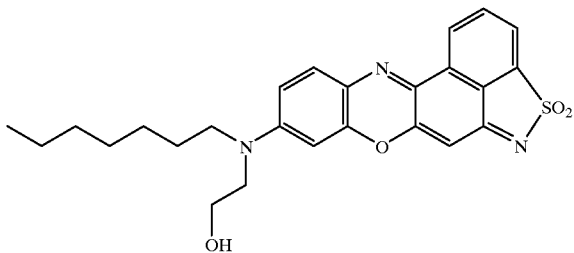

is obtained from the hydrochloride of 5-[N-(n-heptyl)-N-(2-hydroxyethyl)amino]-2-nitrosophenol prepared according to Example 4 and 1,8-naphthosultam.

Yield: 35%; m.p.: 178–180° C.; $\lambda_{max}$: 613 nm (in DMF).

The compounds according to the invention are particularly suitable for use as chromophoric constituents for nonlinear-optically active polymers or electrooptical or photonic components prepared therefrom.

We claim:

1. A chromophoric compound of the general formula 1

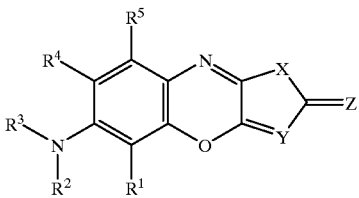

where
$R^1$, $R^4$, $R^5$ are each a hydrogen atom, a linear or branched $C_1$- to $C_{20}$-alkyl radical which is optionally interrupted by 1 to 5 ether oxygen atoms, or an aryl or heteroaryl radical;
$R^2$, $R^3$, which can be the same or different, are each a hydrogen atom, a linear or branched $C_1$- to $C_{20}$-alkyl radical which is optionally interrupted by 1 to 5 ether oxygen atoms, a benzyl radical or an aryl or heteroaryl radical, where one of the radicals $R^2$ and $R^3$ optionally has a hydroxyl or carboxyl group; provided that $R^1$ and $R^2$ or $R^2$ and $R^3$ or $R^3$ and $R^4$ taken together jointly form a 5-membered or 6-membered ring;
Z is a methylene or imino group bearing an electron-acceptor cyano and/or alkoxycarbonyl substituent;
X denotes

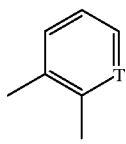

where T denotes CH or N; and
Y is a CH or $CR^7$ group or N where $R^7$ is a linear or branched $C_1$- to $C_{20}$-alkyl radical or a phenyl or a naphthyl radical.

2. A compound as claimed in claim 1, characterized in that the radicals $R^1$, $R^4$ and $R^5$ each denote a hydrogen atom.

3. A compound as claimed in claim 1, characterized in that the radicals $R^2$ and $R^3$, identical or different from one another, have a $C_2$- to $C_7$-alkyl radical.

4. A compound as claimed in claim 1, in which $R^1$, $R^2$, $R^3$, $R^4$ and/or $R^5$ is a heteroaryl radical, selected from the group consisting of thiophenes, thiazoles and pyridines.

5. A compound as claimed in claim 1, in which $R^1$, $R^2$, $R^3$, $R^4$ and/or $R^5$ is an aryl radical selected from the group consisting of benzenes and naphthalenes.

6. A compound as claimed in claim 1, in which $R^1$ and $R^2$ taken together or $R^3$ and $R^4$ taken together form a 5- or 6-membered ring containing nitrogen.

7. A compound as claimed in claim 1, in which one of the radicals $R^2$ and $R^3$ has a hydroxyalkyl or carboxyalkyl group.

8. A compound as claimed in claim 1, in which the radicals $R^2$ and $R^3$ taken together form a 5- or 6-membered ring containing nitrogen.

9. A compound as claimed in claim 8, in which said ring containing nitrogen is saturated.

10. A compound as claimed in claim 8, in which said ring containing nitrogen contains at least one additional hetero atom and is optionally substituted by hydroxyalkyl or carboxyalkyl groups.

11. A compound as claimed in claim 1, in which X is an unsubstituted 1,2-fused benzene ring.

12. A compound as claimed in claim 1, in which Y is a CH group.

13. A chromophoric compound of the general formula 1

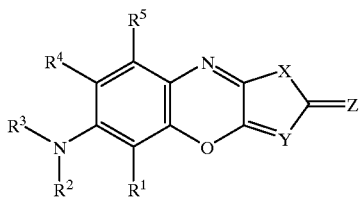

where
$R^1$, $R^4$, $R^5$ are each a hydrogen atom, a linear or branched $C_1$- to $C_{20}$-alkyl radical which is optionally interrupted by 1 to 5 ether oxygen atoms, or an aryl or heteroaryl radical;
$R^2$, $R^3$, which can be the same or different, are each a hydrogen atom, a linear or branched $C_1$- to $C_{20}$-alkyl radical which is optionally interrupted by 1 to 5 ether oxygen atoms, a benzyl radical or an aryl or heteroaryl radical, where one of the radicals $R^2$ and $R^3$ optionally has a hydroxyl or carboxyl group; or $R^1$ and/or $R^2$ and/or $R^3$ and/or $R^4$ taken together jointly form a 5-membered or 6-membered ring;
Z is a methylene or imino group bearing an electron-acceptor cyano and/or alkoxycarbonyl substituent;
X denotes

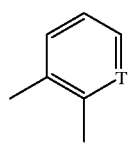

where Z and T together denote $=N-SO_2-C\equiv$; and
Y is a CH or $CR^7$ group or N where $R^7$ is a linear or branched $C_1$- to $C_{20}$-alkyl radical or a phenyl or a naphthyl radical.

14. A compound as claimed in claim 13, which is 9-[N-(n-heptyl)-N-(2-hydroxyethyl)amino]benzo[d]isothiazolo[3,3a,4-ab]phen-7,12-oxazine 4-dioxide.

* * * * *